(12) United States Patent
Porten et al.

(10) Patent No.: US 10,489,657 B2
(45) Date of Patent: *Nov. 26, 2019

(54) METHOD AND APPARATUS FOR SECURING COMPUTER VIDEO AND AUDIO SUBSYSTEMS

(71) Applicant: JANUS TECHNOLOGIES, INC., Half Moon Bay, CA (US)

(72) Inventors: Joshua Porten, Austin, TX (US); Sofin Raskin, Los Altos, CA (US); Michael Wang, Taipei (TW); Shaoan Chin, Cupertino, CA (US); Alexander Indenbaum, Bat Hefer (IL)

(73) Assignee: JANUS TECHNOLOGIES, INC., Half Moon Bay, CA (US)

( * ) Notice: Subject to any disclaimer, the term of this patent is extended or adjusted under 35 U.S.C. 154(b) by 619 days.

This patent is subject to a terminal disclaimer.

(21) Appl. No.: 14/986,504

(22) Filed: Dec. 31, 2015

(65) Prior Publication Data

US 2016/0117558 A1    Apr. 28, 2016

Related U.S. Application Data

(63) Continuation of application No. 13/971,692, filed on Aug. 20, 2013, now Pat. No. 9,232,176.

(Continued)

(51) Int. Cl.
*H04N 7/14* (2006.01)
*H04N 7/18* (2006.01)
(Continued)

(52) U.S. Cl.
CPC ..... *G06K 9/00744* (2013.01); *G06K 9/00255* (2013.01); *G06K 9/00288* (2013.01);
(Continued)

(58) Field of Classification Search
USPC .. 348/14.01, 14.1, 14.08, 14.09, 14.13, 143, 348/169, 142; 386/260, 259, 257
See application file for complete search history.

(56) References Cited

U.S. PATENT DOCUMENTS 4,598,170 A    7/1986 Piosenka et al.
5,191,542 A    3/1993 Murofushi
(Continued)

FOREIGN PATENT DOCUMENTS

EP    2 407 905    1/2012
EP    2 517 144    10/2012

OTHER PUBLICATIONS

Garfinkel (2003), "Terra: A Virtual Machine-Based Platform for Trusted Computing", ACM SOSP. Proc. of the ACM Symp. on Operating System Principles, Oct. 22, 2003, pp. 193-206.

(Continued)

*Primary Examiner* — Daquan Zhao
(74) *Attorney, Agent, or Firm* — Foley & Lardner LLP

(57) ABSTRACT

In general, embodiments of the invention include methods and apparatuses for securing otherwise unsecured computer audio and video subsystems. Embodiments of the invention perform watermarking of video and/or audio data streams output by a computer system. Additional security features that are included in embodiments of the invention include fingerprinting, snooping, capturing streams for local or remote analytics or archiving, and mixing of secure system content with local audio and video content.

15 Claims, 6 Drawing Sheets

Related U.S. Application Data

(60) Provisional application No. 61/772,472, filed on Mar. 4, 2013.

(51) Int. Cl.

| | | |
|---|---|---|
| *G06K 9/00* | (2006.01) | |
| *H04N 21/2347* | (2011.01) | |
| *H04N 21/431* | (2011.01) | |
| *H04N 21/435* | (2011.01) | |
| *H04N 21/4363* | (2011.01) | |
| *H04N 21/4367* | (2011.01) | |
| *H04N 5/913* | (2006.01) | |
| *H04N 9/804* | (2006.01) | |
| *H04N 9/806* | (2006.01) | |
| *G06T 1/00* | (2006.01) | |
| *G10L 19/018* | (2013.01) | |
| *H04N 7/15* | (2006.01) | |
| *G06T 7/246* | (2017.01) | |
| *H04N 9/80* | (2006.01) | |
| *H04N 5/225* | (2006.01) | |

(52) U.S. Cl.
CPC ..... *G06K 9/00604* (2013.01); *G06K 9/00617* (2013.01); *G06T 1/005* (2013.01); *G06T 7/246* (2017.01); *G10L 19/018* (2013.01); *H04N 5/913* (2013.01); *H04N 7/15* (2013.01); *H04N 9/806* (2013.01); *H04N 9/8042* (2013.01); *H04N 21/2347* (2013.01); *H04N 21/4316* (2013.01); *H04N 21/4353* (2013.01); *H04N 21/4367* (2013.01); *H04N 21/43635* (2013.01); *G06T 2201/0065* (2013.01); *H04N 2005/91335* (2013.01)

(56) References Cited

U.S. PATENT DOCUMENTS

| | | | |
|---|---|---|---|
| 5,598,209 A | | 1/1997 | Cortjens et al. |
| 5,724,027 A | | 3/1998 | Shipman et al. |
| 5,946,469 A | | 8/1999 | Chidester |
| 6,028,643 A | * | 2/2000 | Jordan ............... G06F 3/1431 |
| | | | 348/552 |
| 6,061,794 A | | 5/2000 | Angelo et al. |
| 6,088,802 A | | 7/2000 | Bialick et al. |
| 6,453,420 B1 | * | 9/2002 | Collart ............... G11B 19/022 |
| | | | 380/201 |
| 6,457,164 B1 | | 9/2002 | Hwang et al. |
| 6,507,914 B1 | | 1/2003 | Cain et al. |
| 6,546,491 B1 | | 4/2003 | Challener et al. |
| 6,594,780 B1 | | 7/2003 | Shen et al. |
| 6,725,438 B2 | | 4/2004 | Van Ginneken |
| 6,782,424 B2 | | 8/2004 | Yodaiken |
| 6,820,160 B1 | | 11/2004 | Allman |
| 6,922,817 B2 | | 7/2005 | Bradfield et al. |
| 7,120,892 B1 | | 10/2006 | Knol et al. |
| 7,149,992 B2 | | 12/2006 | Chang et al. |
| 7,240,303 B1 | | 7/2007 | Schubert et al. |
| 7,320,071 B1 | | 1/2008 | Friedman et al. |
| 7,330,891 B2 | | 2/2008 | Yodaiken |
| 7,337,100 B1 | | 2/2008 | Hutton et al. |
| 7,340,700 B2 | | 3/2008 | Emerson et al. |
| 7,350,204 B2 | | 3/2008 | Lambert et al. |
| 7,396,257 B2 | | 7/2008 | Takahashi |
| 7,469,343 B2 | | 12/2008 | Ray et al. |
| 7,478,235 B2 | | 1/2009 | England et al. |
| 7,516,217 B2 | | 4/2009 | Yodaiken |
| 7,635,272 B2 | | 12/2009 | Poppe |
| 7,677,065 B1 | | 3/2010 | Miao |
| 7,962,755 B2 | | 6/2011 | Pizano et al. |
| 7,987,497 B1 | | 7/2011 | Giles et al. |
| 8,402,529 B1 | | 3/2013 | Green et al. |
| 8,429,419 B2 | | 4/2013 | Endrys |
| 8,457,367 B1 | * | 6/2013 | Sipe ..................... G06K 9/00221 |
| | | | 382/118 |
| 8,566,934 B2 | | 10/2013 | Srivastava et al. |
| 8,576,282 B2 | | 11/2013 | Salgar et al. |
| 8,606,971 B2 | | 12/2013 | Cain et al. |
| 8,627,106 B2 | | 1/2014 | Pizano et al. |
| 9,076,003 B2 | | 7/2015 | Raskin et al. |
| 9,195,883 B2 | * | 11/2015 | Brewer ............... G06K 9/00302 |
| 9,215,250 B2 | | 12/2015 | Porten et al. |
| 9,231,921 B2 | | 1/2016 | Raskin et al. |
| 2002/0007456 A1 | | 1/2002 | Peinado et al. |
| 2002/0057795 A1 | * | 5/2002 | Spurgat ............... H04H 60/23 |
| | | | 380/1 |
| 2002/0069396 A1 | | 6/2002 | Bhattacharya et al. |
| 2004/0199879 A1 | | 10/2004 | Bradfield et al. |
| 2005/0240892 A1 | | 10/2005 | Broberg et al. |
| 2007/0101387 A1 | * | 5/2007 | Hua ..................... G06F 17/30793 |
| | | | 725/113 |
| 2007/0153091 A1 | | 7/2007 | Watlington et al. |
| 2007/0169156 A1 | * | 7/2007 | Zeng ..................... H04N 7/147 |
| | | | 725/86 |
| 2007/0255963 A1 | | 11/2007 | Pizano et al. |
| 2007/0263725 A1 | * | 11/2007 | Matsubayashi .... H04N 21/4122 |
| | | | 375/240.16 |
| 2008/0091833 A1 | | 4/2008 | Pizano |
| 2008/0130944 A1 | | 6/2008 | Johnson et al. |
| 2008/0247540 A1 | | 10/2008 | Ahn et al. |
| 2008/0263658 A1 | | 10/2008 | Michael et al. |
| 2009/0013111 A1 | | 1/2009 | Berland et al. |
| 2009/0033668 A1 | | 2/2009 | Pederson et al. |
| 2009/0062008 A1 | | 3/2009 | Karmarkar |
| 2009/0212844 A1 | | 8/2009 | Darmawan et al. |
| 2009/0254572 A1 | * | 10/2009 | Redlich ............... G06Q 10/06 |
| 2010/0024004 A1 | | 1/2010 | Boegelund et al. |
| 2010/0149330 A1 | | 6/2010 | Salgar et al. |
| 2010/0192230 A1 | | 7/2010 | Steeves et al. |
| 2010/0201400 A1 | | 8/2010 | Nardone et al. |
| 2011/0102443 A1 | | 5/2011 | Dror et al. |
| 2011/0107379 A1 | | 5/2011 | Lajoie et al. |
| 2011/0131423 A1 | | 6/2011 | Ponsini |
| 2011/0158609 A1 | * | 6/2011 | Gravoille ............ H04N 7/1675 |
| | | | 386/258 |
| 2011/0258460 A1 | | 10/2011 | Pizano et al. |
| 2012/0017197 A1 | | 1/2012 | Mehta |
| 2012/0176545 A1 | | 7/2012 | Estrop et al. |
| 2012/0192129 A1 | | 7/2012 | Bowers et al. |
| 2012/0327181 A1 | | 12/2012 | Thapa |
| 2013/0022948 A1 | | 1/2013 | Angell et al. |
| 2013/0067534 A1 | | 3/2013 | Soffer |
| 2013/0212671 A1 | | 8/2013 | Wang et al. |
| 2013/0238908 A1 | | 9/2013 | Pizano |
| 2014/0010366 A1 | * | 1/2014 | Quinn .................. H04L 9/3252 |
| | | | 380/200 |
| 2014/0075211 A1 | * | 3/2014 | Kumar ................. G06F 1/266 |
| | | | 713/300 |
| 2015/0058587 A1 | | 2/2015 | Wang et al. |
| 2015/0058912 A1 | | 2/2015 | Raskin et al. |
| 2015/0058975 A1 | | 2/2015 | Raskin et al. |

OTHER PUBLICATIONS

International Search Report dated Jul. 18, 2014 in corresponding PCT/US2014/020135.

Landau et al. (2011), "SlitX: Split Guest/Hypervisor Execution on Multi-Core", 3rd Workshop of IO Virtualization, Jun. 14, 2011, pp. 1-7.

U.S. Final Office Action for U.S. Appl. No. 13/971,692, dated Jun. 10, 2015.

U.S. Non-Final Office Action for U.S. Appl. No. 13/971,692, dated Feb. 12, 2015.

U.S. Notice of Allowance for U.S. Appl. No. 13/971,692, dated Sep. 30, 2015.

\* cited by examiner

METHOD AND APPARATUS FOR SECURING COMPUTER VIDEO AND AUDIO SUBSYSTEMS

CROSS-REFERENCE TO RELATED APPLICATIONS

The present application is a continuation of U.S. patent application Ser. No. 13/971,692, filed Aug. 20, 2013, now U.S. Pat. No. 9,232,176, which claims priority to U.S. Prov. Appln. No. 61/772,472, filed Mar. 4, 2013, the contents of all such applications being incorporated by reference herein in their entirety.

FIELD OF THE INVENTION

The present invention relates generally to a system and method for securing computer systems with otherwise non-secure subsystems, more particularly including providing security functionality for video and audio computer subsystems.

BACKGROUND OF THE INVENTION

Conventional computing devices typically include one to many conventional types of input/output (I/O) ports for communicating with connectable external devices such as mice, keyboards, wireless modems, thumb drives, hard drives, etc., as well as internal devices such as hard drives and SSD drives. Conventional computing devices typically further include subsystems for inputting and outputting audio and video streams such as music, videos, video chat and conferences, presentations, etc.

However, the specifications for these I/O and multimedia interfaces and subsystems typically do not provide for security functions such as authentication and verification. Meanwhile, there are a number of applications such as corporate video conferencing that would greatly benefit from efficient provision and management of security over such multimedia interfaces and subsystems.

SUMMARY OF THE INVENTION

In general, embodiments of the invention include methods and apparatuses for securing otherwise unsecured computer audio and video subsystems. Embodiments of the invention perform watermarking of video and/or audio data streams output by a computer system. Additional security features that are included in embodiments of the invention include fingerprinting, snooping, capturing streams for local or remote analytics or archiving, and mixing of secure system content with local audio and video content.

In accordance with these and other aspects, a computing device according to embodiments of the invention includes a host processor subsystem including a CPU and an audio and video subsystem for producing audio and video outputs for playback and display on associated audio and video output devices, wherein the audio and video outputs include audio and video data produced by an operating system and application software running on the CPU of the host processor subsystem, and a secure audio and video subsystem that receives the audio and video outputs from the host processor subsystem and controls an actual playback and display of the audio and video outputs on the associated audio and video output devices.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for understanding the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable providing security functionality and management over otherwise unsecured audio and video data streams output by a computer device. According to one aspect, embodiments of the invention implement watermarking of audio and video data generated by the computer device's audio and video subsystems. Additional security features that are included in embodiments of the invention include fingerprinting, snooping, capturing streams for local or remote analytics or archiving, mixing of secure system content with local audio and video content, biometric security (e.g. face recognition, retina scans, or other image analysis), video surveillance (e.g. using a computer's webcam) and video conferencing. According to certain additional aspects, the security functions performed by embodiments of the invention can be logically transparent to the upstream host and to the downstream device.

Figure 1:
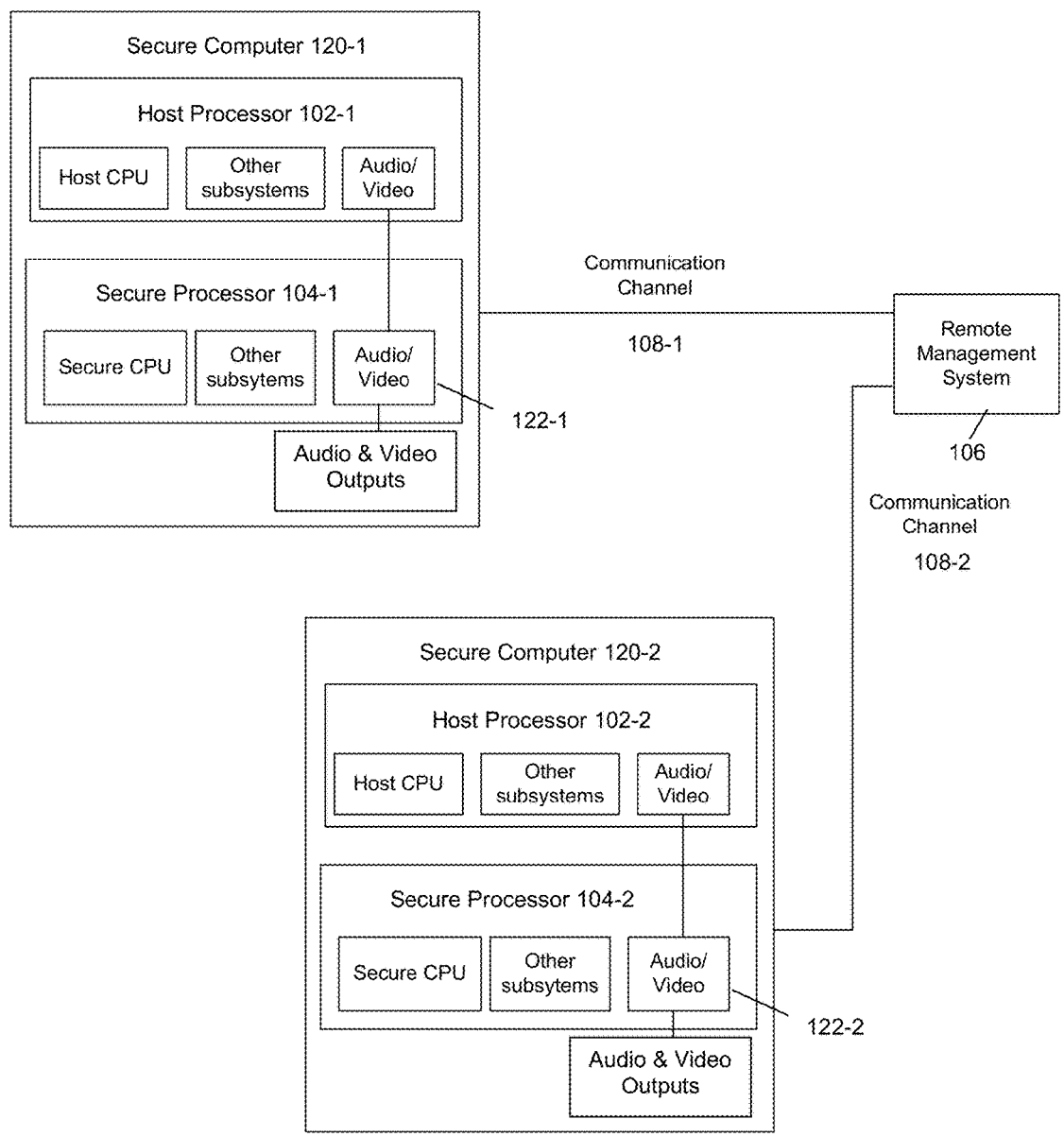
FIG. 1 is a block diagram illustrating an example subsystem for managing security and other functionality over computer audio/video subsystems according to embodiments of the invention.

FIG. 1 is a block diagram illustrating an example management system 100 according to embodiments of the invention. In this example, the system manages security of two secure computers 120-1 and 120-2 connected to Remote Management System 106 via respective communication channels 108-1 and 108-2. As further shown, managed secure computers 120 include a host processor system 102 and a secure processor system 104.

In one non-limiting example configuration according to embodiments of the invention, secure computers 120 are standalone computer systems, similar to conventional desktop, laptop or pad computers. In such an example, host processor system 102 is implemented by a CPU (e.g. ×86), a conventional operating system such as Windows and associated device driver software. In accordance with certain aspects of the invention, in this example, the operation and functionality of secure processor system 104 is completely transparent to the host processor system 102 and associated operating system and application software. Moreover, the operating experience of secure computer 120 by a user is identical to the experience of a conventional desktop, laptop or pad computer, apart from the security functionality of the present invention. So while the application software that can run on the computer is virtually unrestricted, the contents of audio and video streams output by computer 120 are controlled, stored and analyzed by subsystem 104 which enforces security policies as will be described in more detail below.

In these and other embodiments, subsystem 104 is preferably an embedded system. As such, it runs a designated software system furnished together with an embedded processor, and the software cannot be modified by the end-user of the computer under any circumstances. In embodiments, however, certain functionality performed by subsystem 104 may be configured by the end-user if permitted by management system 106. According to aspects of the present invention, subsystem 104 is responsible for performing security functions such as watermarking of audio and video data streams.

Although aspects of the invention will be described in more detail herein in connection with an example implementation of secure computer 120 as a standalone desktop or laptop PC, the invention is not limited to this example implementation. Rather, secure computer 120 can be an enterprise or industrial PC, point of sale PC, thin client, media player, or any appliance or computer device that requires advanced levels of data security, integrity and collaboration.

As shown in the example of FIG. 1, host processor systems 102 include a host CPU, an audio/video subsystem and other subsystems. The other subsystems can include storage subsystems (e.g. SATA, SAS, etc.), I/O subsystems (e.g. USB, Firewire, etc.) and networking subsystems (e.g. Ethernet). Aspects of securing these other subsystems are described in more detail in co-pending U.S. application Ser. Nos. 13/971,582, 13/971,604 and 13/971,732 and U.S. Pat. No. 9,076,003. Those skilled in the art will understand how the audio/video functionality of the present invention can be practiced along with certain or all of these other inventions after being taught by the present disclosure.

The audio/video subsystems of host processor systems 102 can include audio and video capture devices such as cameras, webcams, microphones, audio devices with analog Line-In interfaces, and digital audio players via USB. The audio/video subsystem of host processor systems 102 can also include a conventional graphics controller for formatting and outputting audio and video produced by the host operating system and application software.

As shown in the example of FIG. 1, secure processor systems 104 include a secure CPU, an audio/video subsystem 122 in the channel/path between the audio/video subsystem of host processor 102 and audio and video outputs, and other subsystems corresponding to the other subsystems of host processor system 102. As will be described in more detail below, audio/video subsystem 122 inputs audio and video from the host processor system 102, as well as audio and video streams originating from subsystem 104 and/or system 106, performs various audio and image processing operations and then outputs the processed audio and video to audio and video outputs such as speakers, headphones, video monitors, projectors, etc. The audio and image processing functions can include image resizing, cropping, moving locations of windows, alpha-blending, mixing, watermarking and analytics. Preferably, all audio and image processing operations are performed with a minimum latency, within one or two frame periods. The audio/video subsystem 122 can also encode audio and video streams for recording (e.g. storage and/or sending to system 106) and desktop sharing applications, as well as for streaming over the network for such applications. Audio/video subsystem 122 can also perform audio and/or video compression, or it can be offloaded to a dedicated video compression engine instead of being performed by the secure processor system 104.

An example architecture for implementing secure processor system 104 together with host processor system 102 in a secure computer 120 is described in U.S. Pat. No. 9,231,921, the contents of which are incorporated by reference herein. Those skilled in the art will understand how to implement the principles of the present invention in various configurations of secure computer 120 after being taught by the present disclosure.

According to general aspects, in embodiments of the invention, remote management system 106 is responsible for managing policies that can include lists of allowed devices as well as their type and level of security. Based on these lists, and audio/video devices included in computer 120, remote management system 106 sends appropriate configuration information such as how and whether or not to perform watermarking of certain or all audio or video data streams, how to mix various audio and video streams, which streams to send to system 106 for storage and/or further analysis, which analytics to perform, etc., to subsystem 104 via channel 108.

Various aspects of a remote management system and/or security policies that can be adapted for use in the present invention are described in more detail in U.S. Pat. No. 9,215,250, the contents of which are incorporated herein by reference in their entirety.

Channel 108 can be implemented in various ways, possibly depending on the number and type of devices to be managed by system 106. Channel 108 can be a separate direct point-to-point link between system 106 and secure processor system 104. In other embodiments, channel 108 can be implemented by a transmission medium that is shared between many systems 104. In these and other embodiments, the medium can be any combination of wired or wireless media, such as Ethernet or Wireless LAN. In these and other embodiments, channel 108 can be implemented by various types and/or combinations of public and private networks using proprietary protocols running on top of conventional protocols such as UDP or TCP. In embodiments, data sent over channels 108 is encrypted, or sent over secure VPN to improve security.

Communication channel 108 according to embodiments of the invention supports two logical channels. One channel is responsible for secure transmission of security configuration information from remote management system 106 to secure processor subsystems 104, and status and command messages between subsystems 104 and management system 106. This channel also carries compressed video and audio data from subsystems 104 to system 106 for storage, analysis and/or monitoring. A second logical channel carries video and/or audio data streams from remote management system 106 for display on secure computers 120 (e.g. audio/video conferencing sessions with other secure or non-secure computers managed by system 106).

Figure 2:
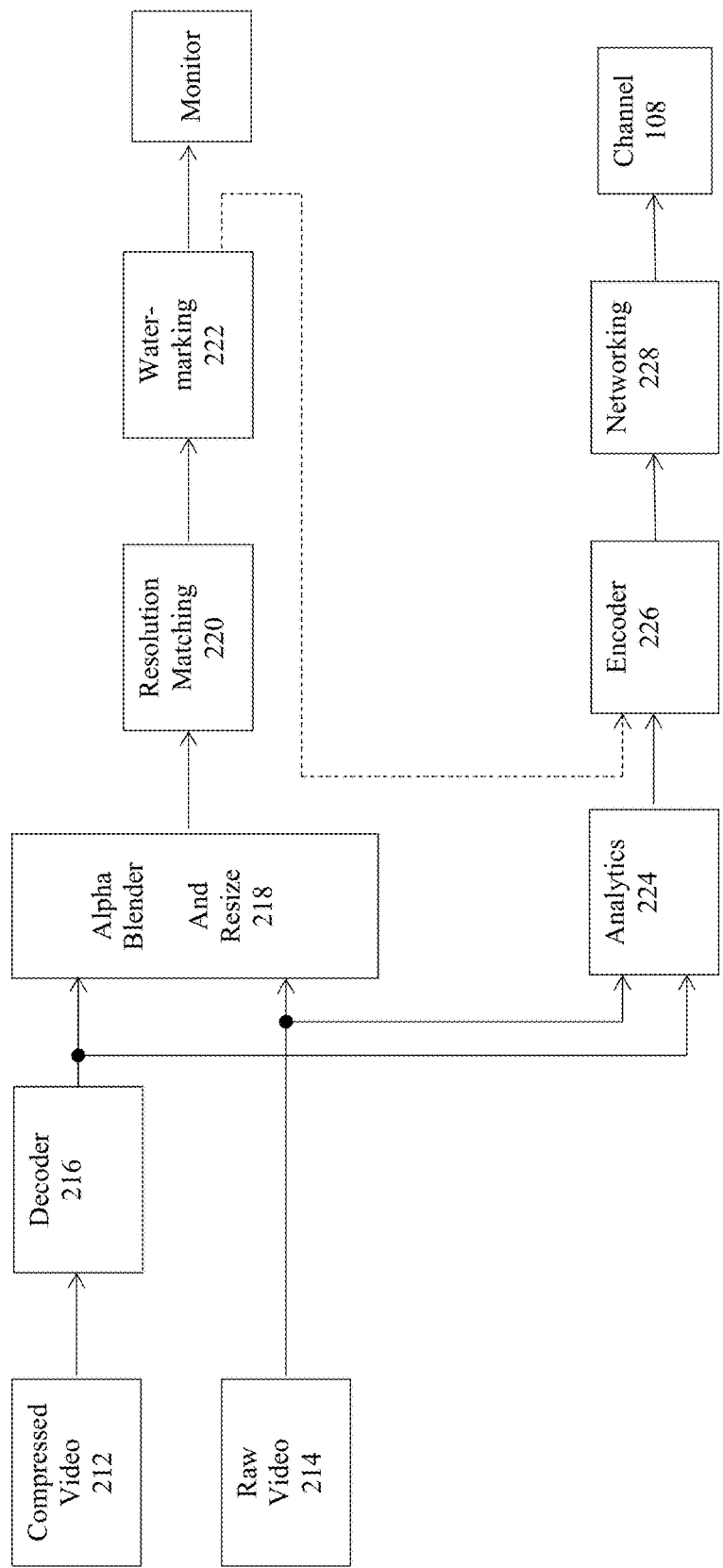
FIG. 2 is a block diagram illustrating an example secure video subsystem according to embodiments of the invention.

A block diagram showing an example video subsystem 200 that can be included in audio/video subsystem 122 according to embodiments of the invention is shown in FIG. 2.

As shown in the example of FIG. 2, in embodiments, there are two types of video channels processed by subsystem 200, compressed video 212 and raw video 214. Encoded and compressed video 212 can include video in a standard format such as MPEG which is converted into a pixel based format such as RGB or YCbCr by decoder 216. Raw video 214 can include streaming video from sources such as a webcam (e.g. via a USB interface). Raw video 214 can also include video streams generated by the host processor system 102 (e.g. operating system and application displays formatted by a graphics controller) and carried by standard interfaces (e.g. DisplayPort, DVI, or HDMI).

According to aspects of the invention, video 212 and 214 can originate from either the host processor system 102 or the secure processor system 104 (either directly or from remote system 106). Although FIG. 2 shows only two channels of input video, it should be apparent that the invention is not limited to just two channels, and embodiments of system 200 allow for adding more channels of either or both of encoded video 212 and raw video 214. It should be further noted that some types of video, such as streams from sources such as still or video cameras, can be either raw or encoded, depending on the sources' configuration.

As shown, embodiments of video subsystem 200 include an alpha blender and resizer block 218. Generally, it performs mixing (e.g. alpha-blending) of the multiple sources of video 212 and 214. Block 218 can also perform resizing, cropping, and moving individual layers respectively corresponding to each video source. Resizing, cropping, and moving operations can be performed independently for each video source.

The final video output from block 218 is thus an alpha-blended mix of all the individual layers. These layers can include, for example, a Windows Desktop from the host processor system 102, decoded video from system 106 (e.g. for a video conference), local video from a camera and an OSD (e.g. graphics/text) layer that is generated by the secure processor 104. In embodiments, block 218 also draws a control window for each of the individual layers that includes controls and/or control regions for moving and resizing the layers. Switching between individual layers can be controlled by keyboard or mouse. For example, various key combinations (e.g. hot keys) can be used to switch keyboard and mouse control between the windows of the respective layers (and also perhaps between host processor system 102 and secure processor 104). An application running on secure processor system 104 responds to these key combinations and the user's manipulation of control window controls to allow the user to modify which windows he wants to see, how, resize them, close them, etc.

It should be appreciated by those skilled in the art that the monitor, secure processor system 104, and host processor system 102 may not always have the same video resolution. There are various ways the video resolutions may differ. For example, the user can change the monitor resolution on the monitor itself or can replace monitor with a new one having a different resolution. As another example, the user can change monitor resolution through an operating system configuration such as that available in Windows. Accordingly, as shown in FIG. 2, embodiments of video subsystem 200 includes block 220 responsible for resolution matching. This can include changing EDID (Extended Display Identification Data) data exchanged between the monitor and video sources 212, 214.

As further shown in FIG. 2, system 200 includes encoding and decoding blocks 216 and 226 (e.g. H.264, MPEG2, etc.). Encoding and decoding can be done either by a chip (FPGA or ASIC) implementing the overall functionality of secure processor system 104, or by an external chip. Decoding is performed to convert video coming from various sources into a single raw format (e.g. RGB pixel data) suitable for alpha blending. Encoding is performed for sending video over the network in the expected format to a remote user, for example a format expected in video conferencing or remote desktop applications or for archiving on a server.

Embodiments of video subsystem 200 such as that shown in FIG. 2 support both hidden and visible watermarking of the video data. In a hidden watermarking example, watermarking block 222 imprints a signature on the image or video stream that is un-noticeable to the naked eye while being viewed or played back but is otherwise detectable by computer systems familiar with the signature. This can allow, for example, an unauthorized copy of a video stream displayed on secure computer 120 to be detected by analysis of the copied stream. This can also allow, for example, a picture taken by a smartphone of a document being displayed on a PC monitor to be analyzed and a watermark inserted into the displayed document to be identified. The watermark preferably is able to resist erasure by third parties (e.g. using image filtering techniques, etc.). Those skilled in the art will understand how to implement many known watermarking techniques in watermarking block 222 after being taught by the present disclosure.

Watermarking block 222 can also perform fingerprinting. Fingerprinting is essentially tagging or hashing of the picture for forensic purposes, such as accountability, traceability, digital rights management, etc.

Embodiments of video subsystem 200 as shown in FIG. 2 include analytics block 224. Analytics can include capturing certain types of video data as it goes to a display (perhaps based on a configuration established by system 106), compressing it in encoding block 226 and sending it over the network via block 228 and channel 108 for storage and analysis. Additionally or alternatively, block 224 can be omitted and blocks 226 and 228 can support recording and archiving of all video data to a server for forensics or compliance. In alternative embodiments, the data that is captured and sent to system 106 via encoding block 224, networking block 226 and channel 108 contains all video layers after alpha blending by block 218.

Analyses performed by analytics block 224 can include video analytics that can detect motion, recognize and track objects, detect certain scenarios, etc. These analyses can be used in real-time to trigger alarms or even limit (or deny) further use of the computer 120 by the user (e.g. through communications with system 106 pursuant to an alarm). Analytics block 224 can also selectively capture video from a webcam or other camera and send it system 106 as part of a facility's overall security (video surveillance) system.

Analyses performed by analytics block 224 can additionally or alternatively include face recognition of an end-user based on analysis of video from a webcam directed at the end-user. Based on such analysis, and/or communications with system 106, secure subsystem 104 could shut down the computer 120 if a different user's face is detected for over a certain period of time, for example.

Analyses performed by analytics block 224 can additionally or alternatively include performing OCR on an application window generated by host processor subsystem 102, for example to identify which applications a user is running. For example, if the application is a web browser, OCR can be performed to determine which URL is being accessed. Such OCR can further be used to identify what the user is currently reading/writing on the screen, and/or to search for keywords (e.g. detect document classification levels not permitted for the user to see, restricted financial data, inappropriate material for workplace, terror activity, etc.).

It should be appreciated that any or all of the above-described functionality of block 224 can be implemented instead on system 106 based on data sent to system via blocks 226 and 228.

Although not shown specifically in FIG. 2, embodiments of video subsystem 200 can include additional functionality such as data reduction, ambient light compensation, and graphics acceleration. Examples of data reduction functionality that can be performed include blurring out license plates, people's faces, adding black squares on windows, etc., to meet privacy concerns. Ambient light compensation is not necessarily related to security. It can be implemented using known functionality that involves image processing to adjust to room lighting conditions.

Additional video subsystem 200 applications according to these and other embodiments of the invention are provided below.

Secure video conferencing: For example, say there are two participants for a video conference—a Local participant (e.g. end-user of computer 120-1) and a Remote participant (e.g. end-user of computer 120-2). Block 224 selectively captures, and block 226 encodes a camera stream and sends it over the network to system 106, where it is relayed to the remote participant. The stream is also processed by blocks 218, 220 and 222 for display on the local monitor (for "self view"). Block 216 also decodes compressed video received from system 106 over the network and originating from the remote participants computer (e.g. another secure computer 120-2) and blocks 218, 220 and 222 process it for display on the local monitor.

It should be appreciated that, in addition to the local user's camera input being compressed and sent to the remote user via blocks 224, 226 and 228, his local desktop generated by host processor subsystem 102 can also be selectively captured by block 224, encoded and shared with the remote user(s) via blocks 226 and 228 (i.e. desktop sharing).

According to certain aspects, this conferencing system can be a better alternative than a PC-based application for several reasons. For example, it runs on secure processor subsystem 104 instead of an application running on host processor subsystem 102, thereby offloading some of the required compute resources, and providing a more reliable high-quality connection. It further does not require any special installation and is always available.

Remote desktop: Block 224 captures the desktop video output produced by host processor subsystem 102 and it is compressed by block 226 and sent out over the network by block 228 for a remote user associated with system 106 (e.g. help-desk, IT administrator) to view. Such a remote user can also take over control of the computer 120's keyboard and mouse using the USB keyboard and mouse emulation. For example, the remote user's keyboard and mouse inputs are sent over the network to secure computer subsystem 104 and translated as though they are coming from the keyboard and mouse of computer 120.

Figure 3:
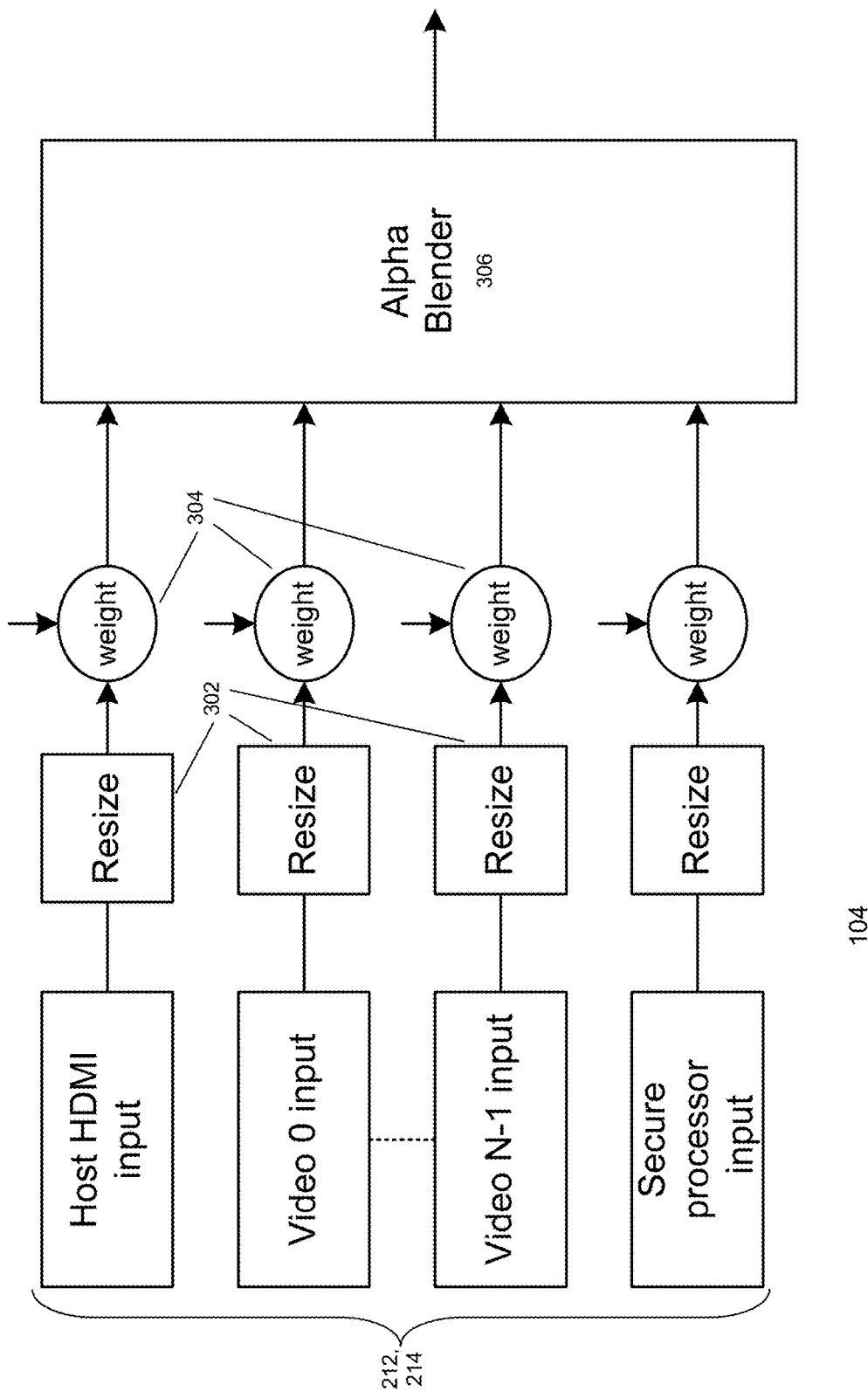
FIG. 3 is a block diagram further illustrating an example implementation for performing resizing and alpha blending in a subsystem such as that shown in FIG. 3.

The video overlay functions supported by embodiments of alpha blender and resize block 218 according to the invention are shown in more detail in FIG. 3.

As shown in FIG. 3, in this example, the video 212, 214 include a HDMI input from host processor system 102, N video inputs (e.g. raw video camera input (via HDMI), decoded webcam input (via USB), etc.) and decoded H.264/MPEG4/etc. video input from secure processor system 104, either directly or from system 106 (e.g. for video conferencing applications). Although not shown in FIG. 3, encoded video sources such as MPEG have been processed to convert them into a common pixel format (e.g. RGB).

Each video source is independently resized and weighted by blocks 302 and 304, respectively. The values and coordinates for each resizing and weighting operation can be controlled by an end-user using an application running on secure processor subsystem 104 as described above. Additionally or alternatively, these coordinates and weights can be configured directly by subsystem 104, either by itself or as configured by system 106.

Figure 4:
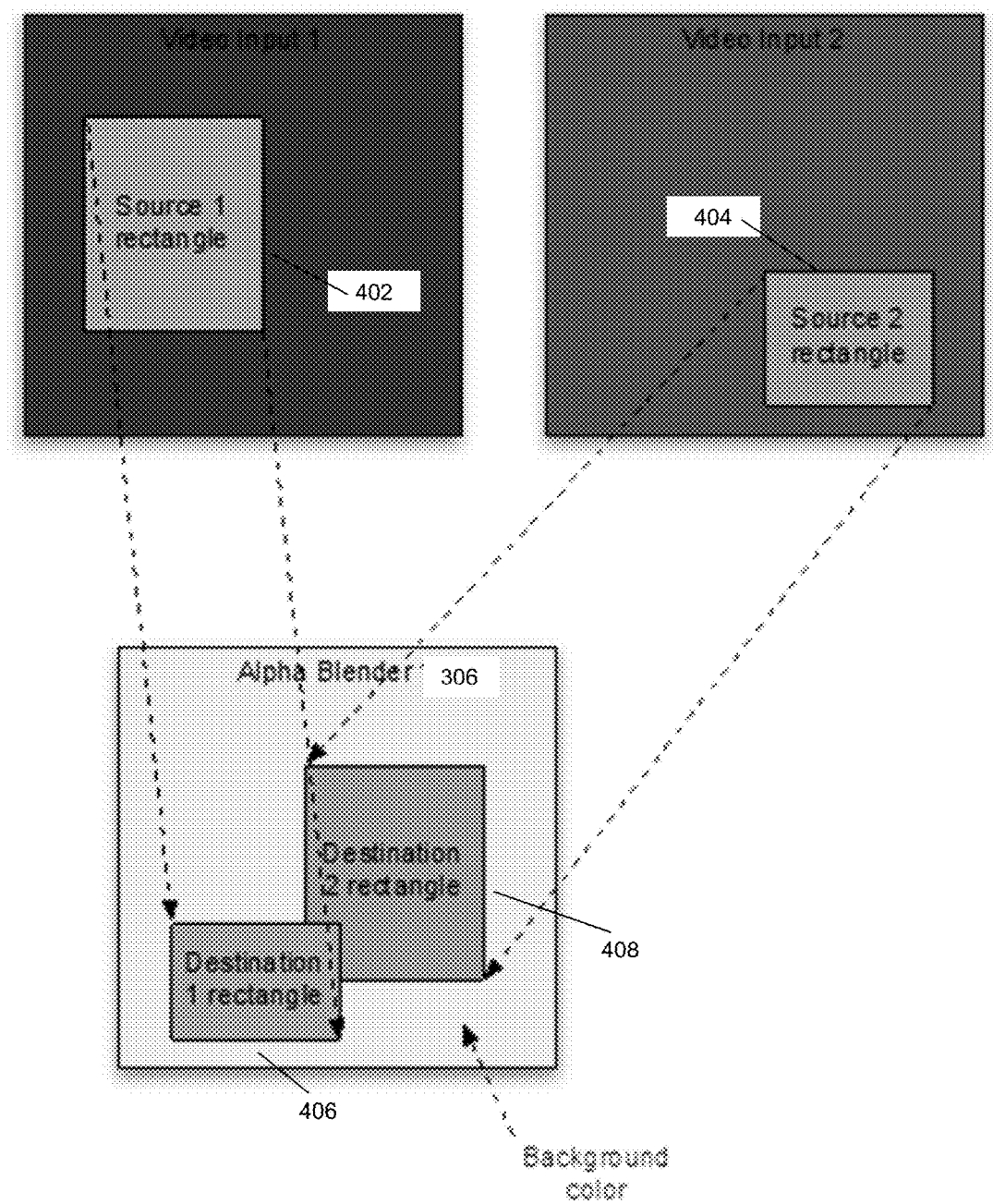
FIG. 4 further illustrates aspects of resizing and alpha blending of video content according to embodiments of the invention.

The resized and weighted video sources are provided to alpha blender 306. The operation of alpha blender and resize block 218 is further illustrated in FIG. 4. As shown, a source rectangle 402 from video input 1 (e.g. from secure processor 104) is extracted and resized by block 302 and weighted by block 304. Another source rectangle 404 from video input 2 (e.g. an HDMI input) is extracted and resized by block 302 and weighted by block 304. The resized blocks 406 and 408 are blended by alpha blender 306 as further shown. In this example, the video input 1 has been given a greater weight, resulting in the partial overlay of block 406 over block 408.

As should be appreciated by those skilled in the art, the overlay of one video block over another need not be completely opaque. Rather, based on weighting values applied by blocks 304, alpha blender 306 can include perform blending of colors such that an overlaid image may be partially visible.

Figure 5:
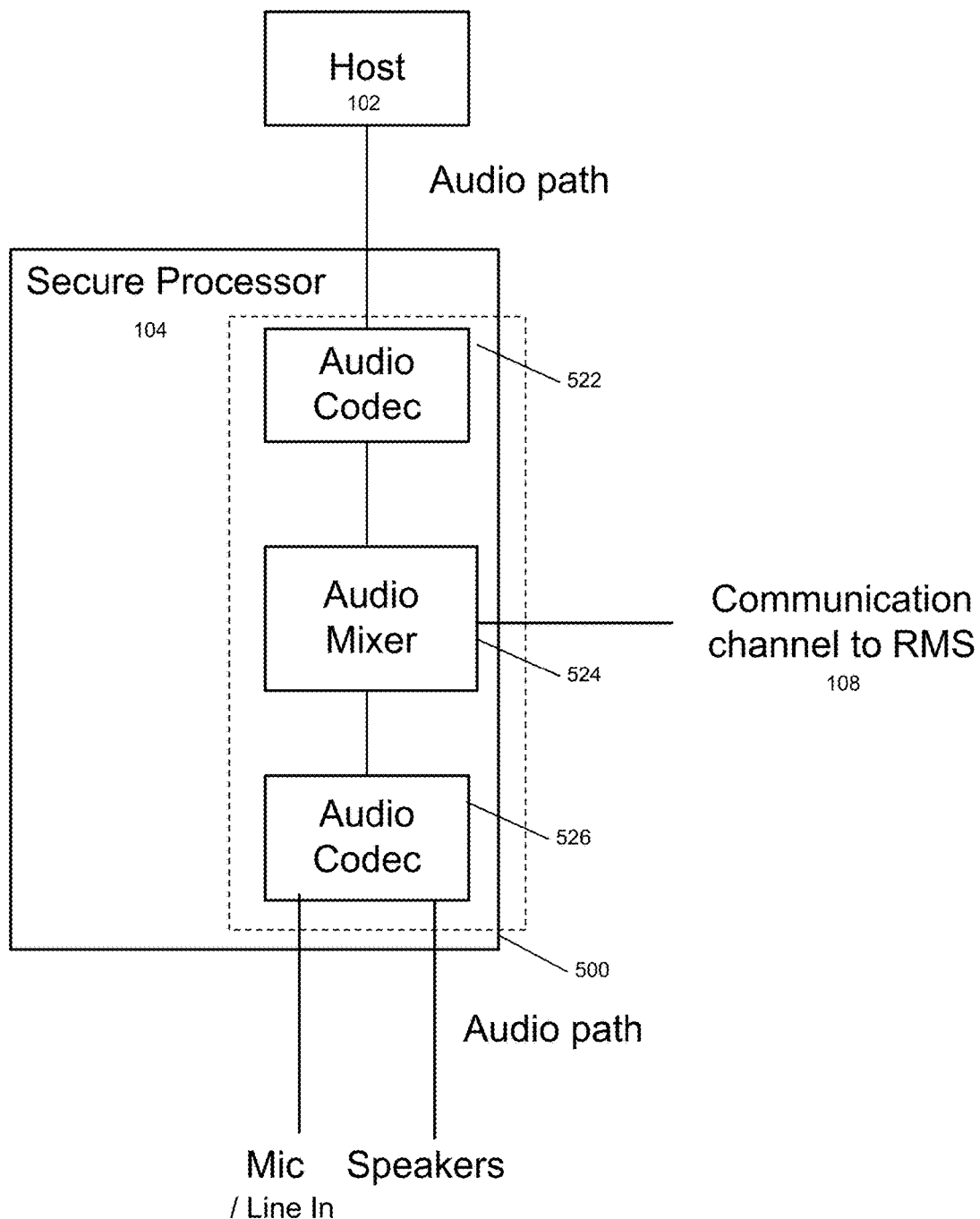
FIG. 5 is a top-level block diagram illustrating an example secure audio subsystem according to embodiments of the invention.

An example audio subsystem that can be included in audio/video subsystem 122 according to embodiments of the invention is illustrated in FIG. 5.

As shown, this example of audio subsystem 500 of secure processor system 104 includes an upstream audio codec 522 coupled to host processor subsystem 102, an audio mixer 524 and a downstream audio codec 526 coupled to computer 120 audio outputs such as headphones and speakers and audio inputs such as microphone and Line-In. In embodiments, audio codecs 522 and 526 can be implemented as stand-alone chips outside of a FPGA or ASIC containing other secure processor system 104 functionality in order to support analog audio.

There are several protocols that carry audio information in digital and analog forms over the audio path in FIG. 5. These include I2S (Integrated Interchip Sound), Intel HDA (High Definition Audio), HDMI, analog audio, and others. Subsystem 500 is preferably flexible enough to support these and other different audio protocols.

Mixer 524 is shown in FIG. 5 as being coupled to remote management system 106 to illustrate that subsystem 500 can further receive audio input data from the remote management system 106, as well as from secure processor system 104, similar to that described for video input data above, and possibly in combination with such video input data (e.g. for video conferencing, remote desktop, and other applications).

Figure 6:
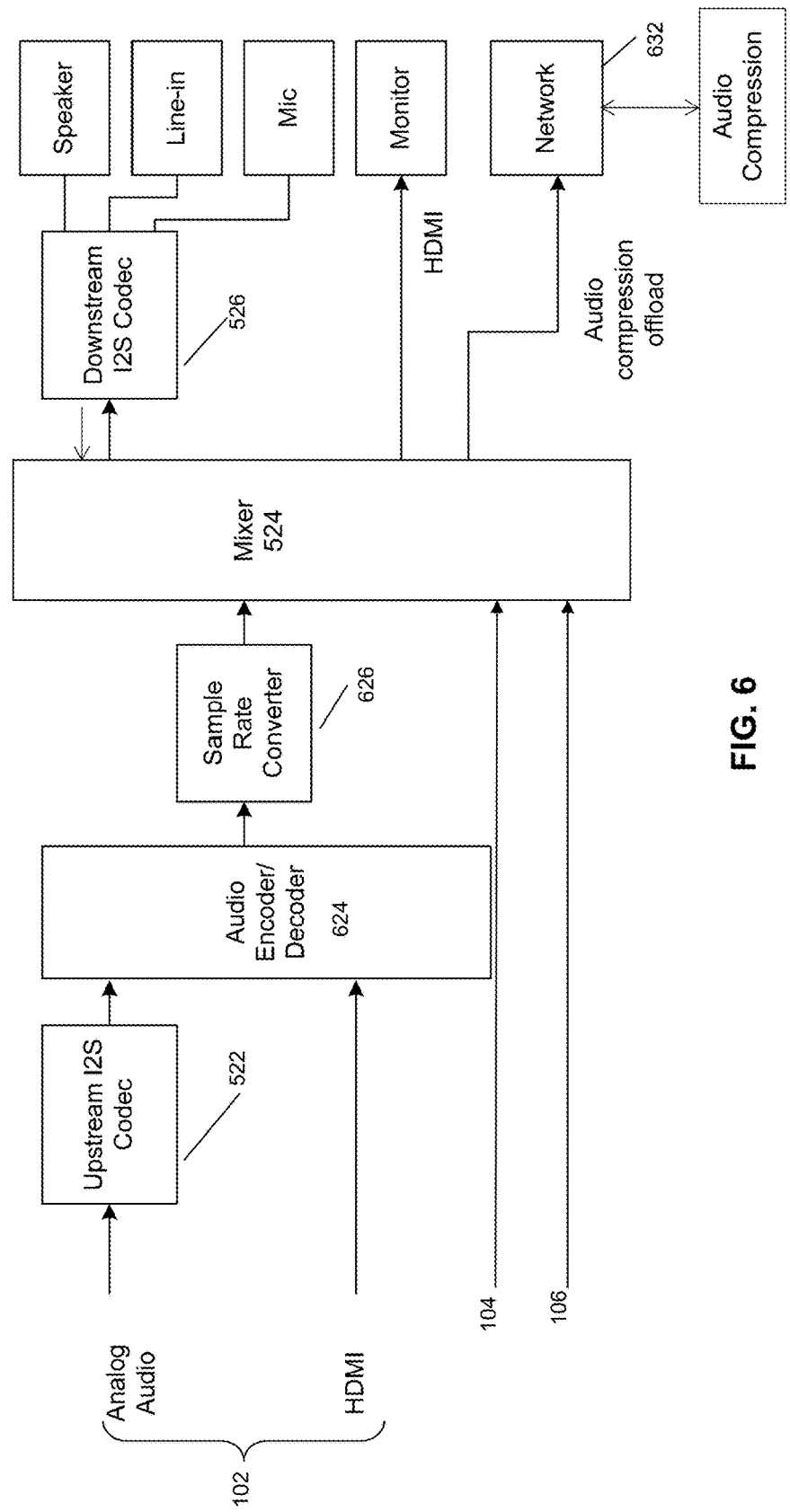
FIG. 6 is a block diagram further illustrating an example configuration of a secure audio subsystem such as that shown in FIG. 5.

FIG. 6 illustrates an example audio subsystem 500 according to embodiments of the invention in more detail.

Similar to video subsystem 200, the function of audio subsystem 500 is essentially to receive audio from various audio sources, process the audio and send the processed audio to various audio destinations.

As shown in the example of FIG. 6, embodiments of audio subsystem 500 include upstream and downstream I2S codecs 522, 526 for processing analog audio streams. As mentioned above, these analog audio streams can be produced by the host processor subsystem 102 or computer 120's microphone and/or Line-In interface. Additional audio inputs from host processor subsystem 102 and include digital audio (e.g. via HDMI or HDA).

Audio encoder/decoder 624 receives the audio inputs from host processor subsystem 102 and computer 120 and performs the appropriate formatting and buffering. For example, it extracts audio from the HDMI stream, and converts it to the same format used by 626 and 524. The output of block 624 is provided to sample rate conversion block 626 for performing any necessary conversions of sample rate between input and output audio streams, and mixer 524.

As further shown in FIG. 6, digital audio inputs can also include those from secure processor subsystem 104 or system 106 (e.g. for video or voice conferencing applications).

Mixer 524 receives all of the audio inputs and produces mixed audio output(s). These can include analog outputs that are sent to host processor subsystem 102 via upstream I2S Codec 522 or digital outputs sent via HDMI or HDA, for example. The audio outputs can also include compressed or encoded audio (e.g. MP3) sent to system 106 via networking block 632 (e.g. for storage or for conferencing or remote desktop applications). It should be noted that audio compression/encoding can be performed by the secure processor system 104 or offloaded to an audio compression engine. Still further, the audio outputs can also be analog audio sent to computer 120's audio outputs such as a monitor (e.g. HDMI) or speakers and/or headphone via downstream I2S codec 526, for example.

Although not shown in FIG. 6, audio subsystem 500 includes functionality to perform acoustic echo cancellation from speaker to audio pick-up. Moreover, embodiments of subsystem 500 can include functionality for performing watermarking of audio stream data, similarly to video subsystem 400, but with the resulting watermark being imperceptible to the ear rather than to the eye.

Embodiments of audio subsystem 500 operate in two modes: conference and high quality mode. When in video conference mode the audio mixer 524, acoustic echo canceller and CODECs 522, 526 are tuned to operate at low sampling rate (for example 8 kHz) to minimize the amount of sample rate conversion needed, thus reducing the load on the processor and overall system latency. When in a high quality mode the mixer 524 and CODECs 522, 526 are tuned to operate at high sample rate (for example, 48 kHz). Sample rate converter 626 performs the necessary sample rate conversion (e.g. to 8 kHz or 48 kHz) based on the sample rates of the input audio streams.

It should be noted that audio/video subsystem 122 of secure subsystem 104 also ensures that output audio streams are synchronized with any corresponding output video streams. This can be done, for example, by combining both of the encoded streams produced by subsystems 200 and 500 into a single bitstream (e.g. MPEG TS (transport stream)). Real-time playback on computer 120 is managed by the secure processor subsystem 104.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computing device comprising:
    a host processor subsystem including a CPU and a video subsystem for producing a video output for playback and display on an associated video output device, wherein the video output includes first and second different streams produced by an operating system and application software running on the CPU of the host processor subsystem; and
    a secure subsystem that receives the video output from the host processor subsystem and controls an actual playback and display of the video output on the associated video output device, wherein the control includes selectively passing the first stream from the host processor to the video output device unchanged, and performing processing on content of the second stream before passing the second stream to the video output device, and
    wherein the video output further includes video data produced by an associated video input device, and
    wherein the secure subsystem performs analytics on the video data produced by the associated video input device and output from the host processing subsystem, and
    wherein the analytics comprise a biometric authentication application that is adapted to determine whether a user of the computing device is authorized to use the computing device based on analysis of the video data, and
    wherein the secure subsystem is adapted to prevent use of the computing device by the user if the biometric authentication application determines that the user is not authorized to use the computing device, and
    wherein the secure subsystem is adapted to prevent use of the computing device by the unauthorized user by shutting down the computing device, and
    wherein the secure subsystem is adapted to shut down the computing device after the user determined by the biometric authentication application to be unauthorized has been present in the video data for a threshold amount of time.

2. A computing device according to claim 1, wherein the associated video input device comprises a video camera.

3. A computing device according to claim 1, wherein the analytics performed by the biometric authentication application comprises performing, using the video data, face recognition of the user.

4. A computing device according to claim 1, wherein the authentication performed by the biometric authentication application comprises performing, using the video data, retina scans of the user.

5. A computing device according to claim 1, wherein the secure subsystem is implemented by one of a FPGA and ASIC that is separate from the host processor subsystem.

6. A method comprising:
producing, by a host processor subsystem including a CPU and an audio and video subsystem, audio and video outputs for playback and display on associated audio and video output devices, wherein the audio and video outputs include first and second different streams produced by an operating system and application software running on the CPU of the host processor subsystem; and
controlling, by a secure audio and video subsystem that receives the audio and video outputs from the host processor subsystem, an actual playback and display of the audio and video outputs on the associated audio and video output devices, wherein controlling includes passing the first stream from the host processor to one or both of the audio and video output devices unchanged, and performing processing on the content of the second stream before passing the second stream to one or both of the audio and video output devices, and
wherein the audio and video outputs further include one or both of audio and video data produced by associated audio and video input devices, respectively, and
wherein the associated audio and video input devices include one or more of a microphone, a still camera, a video camera, and an audio Line In, and
wherein performing processing includes performing analytics on one or more of the audio and video outputs from the host processing subsystem, and
wherein the analytics comprise a biometric authentication application, and
wherein performing processing further includes performing video overlay of one or more video streams not produced by the host processor subsystem in the actual display and playback.

7. A method according to claim 6, further comprising receiving, by a networking block coupled to the secure audio and video subsystem, configuration information that specifies how to control the actual display and playback of the first and second different streams from a remote management system.

8. A method according to claim 6, wherein at least one of the one or more video streams is received by the secure audio and video subsystem from a remote management system.

9. A method according to claim 8, wherein the at least one of the one or more video streams is associated with a video conferencing application.

10. A method according to claim 6, wherein performing processing further includes adding watermarking to one or both of the audio and video outputs from the host processor subsystem before the actual display and playback.

11. A method according to claim 10, wherein the watermarking is not perceptible to a person viewing and/or listening to the actual display and playback.

12. A method according to claim 6, wherein the analytics further include one or more of OCR, application recognition, motion detection, image recognition, image tracking and scene recognition.

13. A method according to claim 6, further comprising, by the secure audio and video subsystem, encoding one or more of the audio and video outputs and sending the encoded one or more outputs to a remote system.

14. A method according to claim 13, wherein the encoding includes compression of the one or more audio and video outputs.

15. A method according to claim 13, wherein the remote system includes one or more of a remote assistance application, a video surveillance application, a desktop sharing application and a desktop recording application.

* * * * *